United States Patent [19]

Nicolai

[11] 4,353,245
[45] Oct. 12, 1982

[54] METHOD AND APPARATUS FOR INDICATING LOSSES OF STORED MATERIALS

[76] Inventor: Walter Nicolai, Maria Louisen Strasse 144, D-2000 Hamburg 60, Fed. Rep. of Germany

[21] Appl. No.: 168,902

[22] Filed: Jul. 14, 1980

[30] Foreign Application Priority Data

Jul. 18, 1979 [DE] Fed. Rep. of Germany ....... 2928936
Oct. 5, 1979 [DE] Fed. Rep. of Germany ....... 2940428
Mar. 13, 1980 [DE] Fed. Rep. of Germany ....... 3009549
May 17, 1980 [DE] Fed. Rep. of Germany ....... 3018949

[51] Int. Cl.³ ............................................. G01M 3/32
[52] U.S. Cl. ............................... 73/49.2; 73/290 R; 340/605; 340/618
[58] Field of Search ............... 73/49.2, 40, 290 R; 340/605, 612, 618

[56] References Cited

U.S. PATENT DOCUMENTS

| | | | |
|---|---|---|---|
| 3,218,856 | 11/1965 | Bossard | 73/40 X |
| 3,537,298 | 11/1970 | Kapff | 73/49.2 |
| 3,538,745 | 11/1970 | Wright et al. | 73/49.2 |
| 3,538,746 | 11/1970 | Jacobs et al. | 73/49.2 |
| 3,841,146 | 10/1974 | Cross et al. | 73/49.2 |
| 3,939,383 | 2/1976 | Alm | 73/49.2 X |

Primary Examiner—Anthony V. Ciarlante
Assistant Examiner—Joseph W. Roskos
Attorney, Agent, or Firm—Beveridge, DeGrandi & Kline

[57] ABSTRACT

Improved method and apparatus for indicating losses of stored liquid materials or penetration of liquid in liquid storage tanks, in connection with a liquid meter. The level change is automatically measured by means of a level meter as a function of time intervals, and a level change not caused by removal or filling under normal operation conditions is indicated as a loss of stored material (such as e.g. due to theft or leaks) or as a penetration of liquid (such as e.g. ground water).

17 Claims, 8 Drawing Figures

METHOD AND APPARATUS FOR INDICATING LOSSES OF STORED MATERIALS

The invention relates to a method for indicating losses of stored materials or penetration of liquid in liquid storage tanks by measuring the change in the level of the said material, as well as to apparatuses for performing this method.

Numerous apparatuses for indicating losses of stored material, such as e.g. leak indicators for liquid storage tanks, are known in which the liquid level is monitored with a level meter during the varyingly long times when the storage tank is not supplying consumers of the stored material.

However, there is no monitoring of the tank for losses of material during the removal of liquid under normal operating conditions. Thus, losses of stored material which take place under abnormal operating conditions, such as e.g. the unauthorized removal by pumping out via the filler cap or losses due to larger leaks, cannot be included and indicated in the monitoring of the continuous removal of liquid under normal operating conditions.

In another known apparatus for indicating losses of stored material (German Pat. No. 1 222 329), a vacuum pump produces and maintains a partial vacuum in the air space above the liquid level in the tank, and this partial vacuum is at least as large as the hydrostatic pressure of the liquid at the lowest point in the tank. A level meter is provided in the tank for controlling the partial vacuum as a function of the fill level. Also with this apparatus an alarm signal is given by means of the level meter when the level rises without the tank being filled under normal operating conditions. However, such an apparatus requires a liquid storage tank which is tightly sealed off relative to the atmosphere and in whose free space above the stored material level a partial vacuum is constantly maintained by a vacuum pump controlled in a pressure-dependent manner.

The object of the present invention is to provide, by simple means, a novel method and a novel apparatus of the type referred to hereinbefore, so that it is possible during removal of stored material under normal operating conditions to establish an abnormal liquid loss or the penetration of liquid and also to indicate these, without a partial vacuum being necessary in the free space above the liquid level in the storage tank.

According to the invention this problem is solved in that the level change is automatically measured by means of a level meter as a function of time within predetermined equidistant time intervals, and a level change not caused by removal or filling under normal operating conditions is indicated as a loss of stored material (such as e.g. due to theft or as leaks) or a penetration of liquid (such as e.g. ground water).

The invention is based on the utilization of the fact that level changes in a liquid storage tank, e.g. reductions in the level going beyond a maximum level change during liquid removal through one or more connected operating pumps, are to be considered either as indicating a leak in the tank wall or in the pipe system connected thereto or as an indication of an unauthorized removal of stored material, e.g. via the filling pipeline. The maximum amount is considered to be the level change (e.g. reduction) occurring when all the liquid removal pumps connected to the storage tank continuously remove the stored material at the full pump capacity and the tank is not simultaneously topped up again under normal operating conditions. In the case of a storage tank from which no liquid is removed over a long period, e.g. the tank of a filling station which does not operate at night, any drop in the level must be considered as a "maximum amount."

The invention is also based on the fact that a level increase in the liquid storage tank not caused by authorized filling must be considered as an indication of an inrush of liquid, in the case of flooding into the venting and/or ventilating openings of the tank, or as a leak in the tank wall or in the connected pipe system, in the case of entry of liquid (e.g. ground water), into the tank from the outside as a result of a higher hydrostatic pressure, or as a sign of unauthorized filling of the storage tank with a liquid (e.g. liquid with a higher specific gravity than that of the stored material) for the purpose of unauthorized removal of stored material by pumping out the floating lighter stored material.

Operation in accordance with the invention of the apparatus for performing the method is ensured both with cubic, cylindrical, spherical and other shaped storage tanks, including vehicle fuel tanks. The stored material level can be measured by means of commercial level meters, whose initial fill level information if not already available in electrical form, can be converted into electrical data prior to further processing in known manner.

The invention is described in greater detail hereinafter relative to non-limitative embodiments and the attached drawings, which show in.

Figure 1:
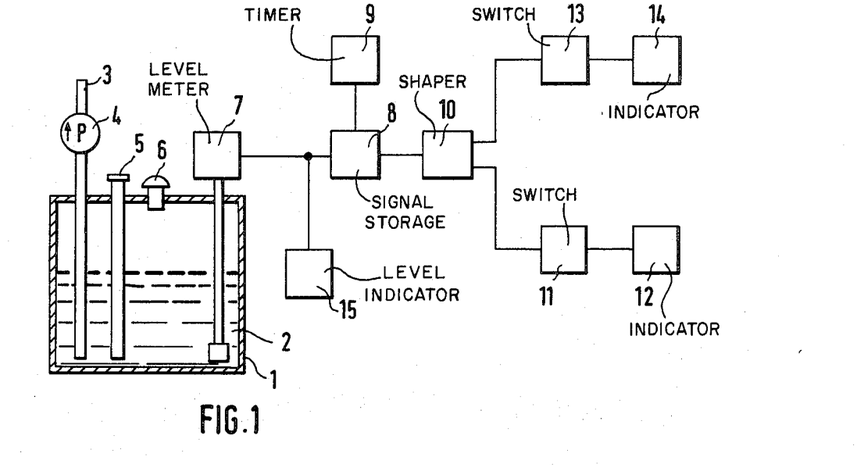
FIG. 1 an embodiment of the apparatus according to the invention operating in analog manner with cyclically controlled instantaneous value storage and two threshold switches as alarm threshold meters for detecting unauthorized level changes.

The embodiment of FIG. 1 can be an analog-operating apparatus for indicating losses of stored material connected by means of the level meter 7 with the liquid storage tank 1 which is to be monitored for losses. Storage tank 1 contains the stored liquid material 2 fed in by means of the filling pipeline 5 and from which under normal operating conditions the material can be removed by removal line 3 using removal pump 4. Tank 1 is provided with an air vent cap 6. In known manner it is ensured that the liquid level data appear as electrical d.c. voltage values at the output of level meter 7. Timer 9 connects the input of the instantaneous value store 8 to the output of the level meter 7 in an equidistant, but adjustable timing cycle for a given interrogation time, e.g. 100 microseconds. The instantaneous value store detects and stores, for each of the periodic time cycles occurring in equidistant time intervals, the instantaneous level value at the particular time in question. This instantaneous level value is present at the instantaneous value store output as an electrical d.c. voltage signal until the next timing cycle of timer 9 when the instantaneous value store input is again briefly connected to the output of the level meter 7 and there is an immediate exchange of the stored value to the new instantaneous value which then appears at the instantaneous value store output as an electrical d.c. voltage state until the next timing cycle. Instantaneous value stores are also known as sample and hold circuits.

The size and slope direction of the d.c. voltage change at the instantaneous value store output at the instant of fill level interrogation are a function of the size and direction of the level change (level increase or decrease) within the equidistant time intervals between the timer cycles. With a constant level the voltage size and slope direction change is equal to zero. If the level increases or decreases within the equidistant time intervals, the voltage at the instantaneous value store output changes at the moment of the particular level interrogation as a function of the size and slope direction (e.g. a level increase may mean increasing voltage and rising slope direction and a level decrease decreasing voltage and falling slope direction), for example based on a fixed voltage potential zero at level measurement zero. However, this reference voltage threshold can also be transposed into another d.c. voltage range without impairing the operation of the apparatus according to the invention. The pulse shaper 10, connected behind the instantaneous value store 8, contains switching elements for the potential separation of the d.c. voltage components of the output signals of the store and for converting their switching slopes into pulses, preferably pulses with the same direction, as well as switching elements for the retransmission of the pulse voltage components (switching slopes) of the output signals of the instantaneous value store 8 beyond an electrical separating filter of known construction with voltage direction-dependent elements, e.g. diode arragements with separate output branches having different forward and reverse directions. The output branch of the electrical separating filter connected to the input of the threshold switch 11 contains an inverter, whilst the other output branch contains a high input sensitivity monostable multivibrator for the purpose of producing short one-shot pulses of given amplitude.

The switching elements for potential separation of the d.c. voltage components and for retransmitting the pulse voltage components can, for example, be RC networks, pulse transformers or the like. The electrical separating filter for retransmitting the pulse voltage components of different slope direction may, for example, only supply the threshold switch 11 with switching signals of falling slope (as the level drop criterion) after prior inversion, whilst only supplying the monostable multivibrator with switching signals having a rising slope (as the level increase criterion). As a result of the high input sensitivity of the monostable multivibrator even switching signals with a very small amplitude as a criterion of a very small level increase are able to trigger the monostable multivibrator and release at its output short one-shot pulses, for example with a rising slope direction. Large amplitude switching signals as a sign of a significant level increase always trigger the monostable multivibrator and thus always release one-shot pulses at its output. As a result of these one-shot pulses, threshold switch 13 is switched through (or switched over) in each case, whereas the threshold switch 11 only switches through (or switches over) in the case of excessive level reduction and the resulting excessive amplitudes of the switching signals supplied to its input. As a result of an authorized maximum possible level reduction of the stored material, e.g. due to continuous operation of the removal pump 4 connected to the liquid storage tank 1 or in the case of the empty or almost empty tank with the resulting maximum possible switching signal amplitudes at the input of switch 11, the latter is still not switched through (or switched over), because the maximum possible switching signal amplitude under normal operating conditions still does not reach the switching threshold. The switching thresholds of the threshold switches are adjustable. An inversion of the switching signals with falling slope direction is unimportant for the operation of the apparatus according to the invention. In certain cases it holds the advantage that both threshold switches are triggered by switching signals (pulse edges) with the same direction of rise.

The alarm signal devices with self-holding circuits 12 and 14 connected behind the threshold switches 11 and 13 indicate optically and/or acoustically which switch is switched through. A response of alarm signal 12 indicates that threshold switch 11 has operated, i.e. "excessively large unauthorized level drop" and a response of alarm signal 14 "unauthorized level increase" or "unauthorized filling".

When an authorized filling of the liquid storage tank is taking place alarm signal 14 can be temporarily switched off by an authorized person, e.g. by means of a manual time switch in order to avoid false alarm indications. Level indicator 15 is connected to the electrical measured value output of level meter 7 and comprises, for example, a commercial electrical voltmeter, whose measuring scale is calibrated in cm.

Figure 2:
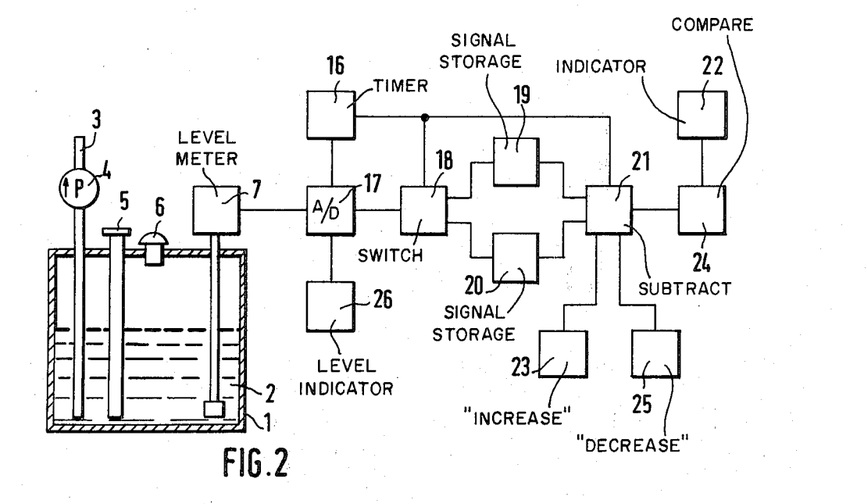
FIG. 2 an embodiment of the apparatus according to the invention operating in digital manner with a digital subtractor for detecting unauthorized level changes.

The diagrammatic representation of FIG. 2 can, for example, be a digitally operating apparatus for indicating stored material losses connected by means of level meter 7 with the liquid storage tank 1 which is to be monitored for material losses. As in FIG. 1 the storage tank contains the stored liquid 2 introduced by means of the filling line 5 and removeable by means of removal line 3 and removal pump 4 under normal operating conditions. Tank 1 is provided with an air vent cap 6. Here again it is ensured by means of known technical measures that the level data are available at the output of level meter 7 as electrical d.c. voltage values. These d.c. voltage values are converted by means of the analog/digital converter 17 into digital data and are alternately supplied to the digital storage cells 19 or 20 in the equidistant and preferably adjustable timing cycle of timer 16 for a given short time, e.g. 1 millisecond via electronic switch 18 which also switches over with the timing of timer 16. These digital storage cells take the input signal state at the time when a change occurs compared with the stored state. Such digital storage cells are well known in digital technology. They alternately store the two last fill level data transmitted via electronic switch 18 with the timing of timer 16. With the timing cycle of timer 16 the digital subtracter 21 connected to the two digital storage cells subtracts the data of successively measured level values stored in the two digital storage cells 19, 20 and supplies this information according to amount and sign to digital comparator 24, as well as sign signals 23 or 25. The sign indication "increase" (corresponding to level increase) or "decrease" (corresponding to level decrease) is obtained by known circuitry, whereby inter alia the alternating occupancy of the digital storage cells 19, 20 with the last measured level value and the previously measured value are processed in the correct order. This sign indication is indicated by sign signal 23 for level increase and 25 for level decrease. When successive measured level values are the same the sign indication is suppressed by known means (see publications on digital subtracters). The digital comparator 24 compares the amount of the level difference supplied by the digital subtracter 21 with each timing cycle of timer 16 with a fixed, presettable comparison or reference quantity which may, for example, be an equivalence value of the authorized maximum possible level reduction of the stored liquid within the equidistant time intervals of the timer cycles, e.g. due to continuous operation of the removal pump 4 connected to the liquid storage tank 1 with maximum pump delivery in the maximum level change range of the stored material in the case of a constant liquid removal quantity (plus safety margin). If at least one piece of level difference data supplied from the digital subtracter 21 in the timing cycle of timer 16 coincides with or exceeds the reference quantity in the digital comparator 24, the latter releases a signal and sets the alarm signal with the self-holding circuit 22 as a criterion of an excessively large unauthorized level reduction or an authorized (known) or unauthorized large level increase. The (alarm or signed) signals 22, 23 are preferably optical and/or acoustic signals. During an authorized filling of the liquid storage tank they may be temporarily switched off by an authorized person, e.g. by means of a two-pole manual time switch in order to prevent false alarm indications. The digital fill level indicator 26 is connected to the digital/analog converter 17 and indicates the analog measured level values converted into digital data in digital form.

If the level meter 7 supplies the level values in the form of an alternating current frequency information. e.g. as a frequency variation, or as digital information, in the case of an apparatus according to FIG. 2 or a similarly functioning device with digital operation, the analog/digital converter is unnecessary and the digital level information can be supplied directly across the electronic switch 18 to the digital storage cells 19, 20.

The timing frequency of timer 9 or 16 can be varied within wide limits without fundamentally impairing the operation of the apparatus according to the invention. Thus, e.g., in the case of large liquid storage tanks, it has been found that equidistant timing intervals of a few minutes to a few hours (depending on the tank size) are advantageous, whereas equidistant timing intervals of approximately 10 seconds to approximately 1 minute are advantageous for vehicle tanks.

It is also fundamentally unimportant for the effectiveness of the apparatus according to the invention whether the individual operating elements are constructed in discreet, monolithic or any other way, e.g. in separate constructional groups.

The apparatus according to the invention can also be exclusively used for indicating excessively large unauthorized level reductions or exclusively for indicating unauthorized level increases without departing from the scope of the invention.

Figure 3:
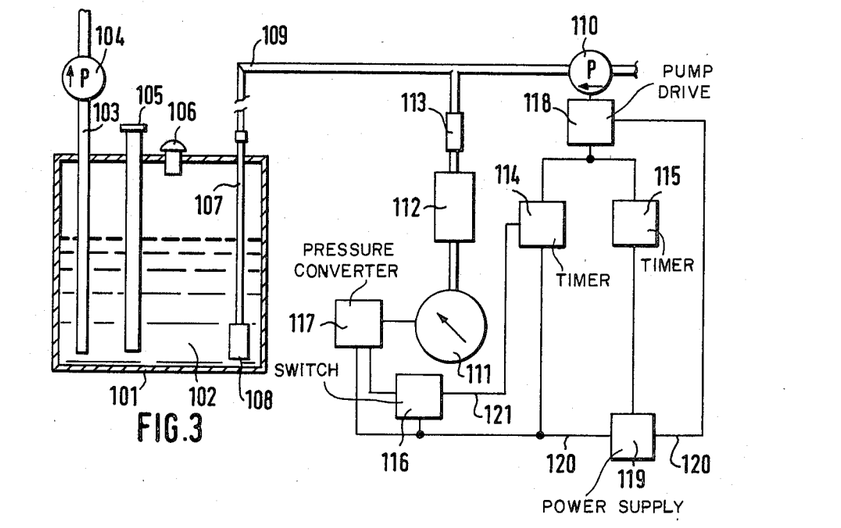
FIG. 3 the fundamental operating principle of a second embodiment of the apparatus according to the invention in conjunction with a pneumatic level meter for automatic continuous level measurement and indication.
Figure 4:
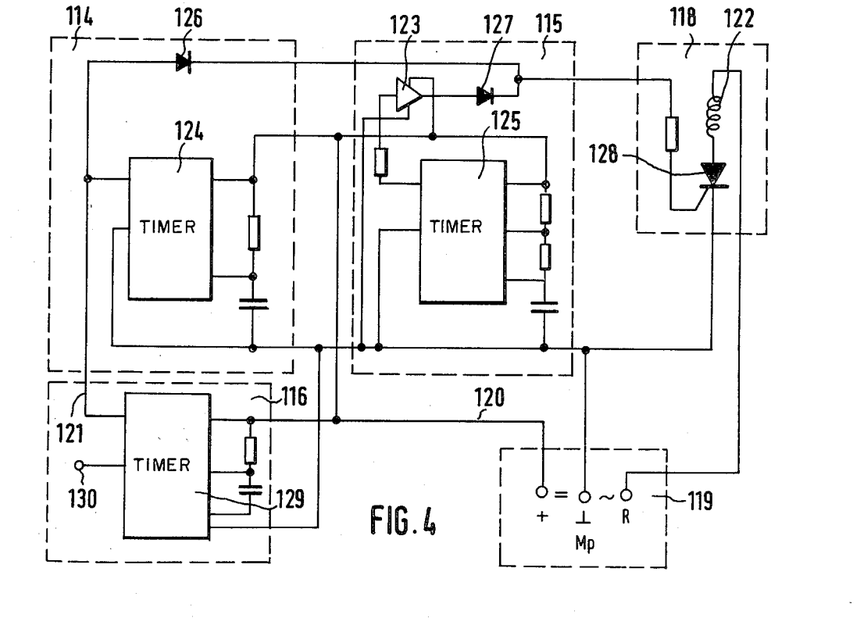
FIG. 4 a connection diagram of the control logic system as an example of different constructional possibilities of the apparatus of FIG. 3.

FIGS. 3 and 4 relate to another embodiment of the apparatus according to the invention. This embodiment makes it possible have the advantages of the invention, particularly the possibility of automatic continuous level measurement and indication, using a pneumatic level measuring principle without electrical wiring within areas where there is an explosion risk, including storage tanks or other vessels with flammable liquids in which explosive gas/air mixtures or vapour/air mixtures can form. When used as a level meter this embodiment offers the advantage of a continuous level indication with a particularly high measuring and indicating accuracy.

FIG. 3 diagrammatically shows the operating principles of a pneumatic level meter for automatic continuous level measurement. The dip pipe 107, of which measuring cup 108 forms a part, is so arranged in the liquid storage tank 101, whose level state or change is to be monitored, that the dip pipe extends to the bottom of the tank or into the vicinity thereof. Tank 101 is filled with liquid 102 by means of filling line 105 and is emptied under normal operating conditions by means of removal pump 104 via removal line 103. Above the stored liquid level, tank 1 is constantly connected to atmosphere via venting and ventilating connection 106. The inner area of the dip pipe 107 is held within a narrow desired pneumatic pressure range by pneumatic pump 110 via dip pipeline 109. Under normal operating conditions this pressure range is at least as large as the hydrostatic pressure of the stored liquid as the lower end of the dip pipe. The pressure within the dip pipe is measured and indicated by pressure gauge 111, e.g. a manometer, which is connected to the dip pipeline 109 and/or is converted by means of a pressure converter 117 into an electrical control quantity. The connecting line between the dip pipeline 109 and pressure gauge 111 contains the air blast damping volume 12, e.g. a small container, and the air blast damping choke 113, e.g. an air flow choke. These damping members have a disadvantageous effect on the interfering and indicating sensitivity, because they damp the pressure fluctuations and surges caused by pump operation or tank filling.

Whenever the electrical power supply 119 is switched on, a timing element 114 is started and releases a so-called second signal of a predetermined duration. This setting signal puts the pneumatic pump 110 into operation by means of the control and driving unit 118 for the transit time of said signal. The transit time of the setting signal is preferably selected in such a way that on first operating the level meter (e.g. when the dip pipe is still filled with liquid) or after a temporary power failure, the pneumatic pump 110 is reliably able to force back into the storage tank any stored liquid which may have penetrated the dip pipe due to natural leaks in the dip pipe system and the fittings and components connected thereto (such as the pneumatic pump, pressure gauge, etc.) A short time after switching off the pneumatic pump and during the transit of the setting signal there is a hydrostatic equilibrium between the dip pipe atmospheric pressure and the stored liquid column at the lower end of the dip pipe. As the pressure changes, which may occur during the transit time (pulse width) of the setting signal and in the following air flow damping phase, do not represent utilizable measuring quantities for the liquid filling level and could cause indication errors and the like, time switching element 116 is provided which, like the time switching element 114, is started whenever the electric power supply 119 is switched on and which also releases a signal of a predetermined duration (pulse width) for "masking" the pressure changes which cannot be utilized for the level measurement occurring during the transit time of the setting signal and during the air flow damping phase.

The time switching element 116 can be started both automatically, by switching on the power supply 119 via the power supply line 120 to the timing switching element, and by a control signal from timing switching element 114 via control line 121. The transit time (pulse width) of the masking signal should be at least as long as the transit time (pulse width) of the setting signal and is preferably significantly longer. The masking signal can, for example, interrupt the function of pressure gauge 111 for the duration of the signal transit time (signal pulse width) in order to prevent an incorrect level indication or the retransmission of incorrect pressure data, e.g. through the control of a commercial three/two-way solenoid valve which temporarily separates the pressure gauge from the dip pipe line. It is also possible, directly or indirectly via logic connecting circuits, to prevent in a time-limited manner the giving of an alarm in the case of an apparatus as described relative to FIGS. 1 and 2, e.g. by blocking (resetting) an alarm flip-flop circuit for the duration (pulse width) of the masking signal.

In order to compensate pressure losses occurring during the correct operation of the level meter due to natural leaks in the dip pipe and the connected line system, so that there is continuously a hydrostatic equilibrium with a negligible range of variance between the dip pipe internal pressure and the liquid pressure at the lower end of the dip pipe, timing switching element 115 is provided, whose output pulse signal puts into operation for a short time and at equidistant time intervals pneumatic pump 110 by means of the control and driving part 118.

The pulse width of the output signal is advantageously dependent on the maximum expected or permitted natural leaks and the average delivery of the pneumatic pump, based on the different fill levels. For example in the case of normal operational sealing of the fitting and lines on the level meter, it should be well below 1 second with an output signal pulse spacing of approximately 3 to 30 minutes. However, other pulse width spacing values are possible.

When the level meter is used on vehicle tanks, shorter pulse spacing may be advantageous in order to achieve an even more accurate level measurement.

An example of a logic circuit for controlling the pneumatic pump operation and for masking the functions of the pressure evaluation and indication of the level meter or the alarm functions is shown in FIG. 4. It constitutes a simplified circuit diagram of the time switching elements 114, 115 and 116, the control and drive part 118 and the power supply 119, with the most important external connections necessary for the understanding of the operation of the components.

The time switching element 114 can have a commercial monolithic timer 124 which, on connecting the power supply 119 to its output releases a positive signal (H-state), namely the setting signal referred to when explaining the operation of the level meter relative to FIG. 3. Due to this positive signal (H-state) by means of the isolating diode 126 and a not further defined current limiting resistor (which also limits the output current of the time switching element 115), a thyristor 128 arranged on the circuit of magnet core 122 of the pneumatic pump drive (e.g. the electromagnet of a swing lever pneumatic pump) is switched through, and consequently pneumatic pump 110 is put into operation.

In FIG. 4 the current limiting resistor, the thyristor 128 and the magnet coil 122 of the pneumatic pump drive are arranged in the control and drive part 118. The output signal of the time switching element 114 also controls the current switching element 116 via line 121.

The time switching element 116 can be a commercial monolithic component 129 with known external connections, namely a monostable flip-flop with a Schmitt trigger input, controllable both by positive and negative pulse edges and a predetermined duration at its output 130, negative signals (L-state) of predeterminable duration. In the present case the component is controlled exclusively by positive pulse edges.

Alternatively the time switching element 116 can be constructed as a commercial monolithic timer of the same or different type as the timer 124 (without the additional isolating diode). The RC networks of the external connections are then to be selected in such a way that there is a longer signal transit time (output pulse width) than in the case of the values of the outer connection (outer wiring) of timer 124. On connecting the power supply 119 via line 120 a positive signal (H-state) is released at the output of timer 129 which, after inversion by an inverter (not shown), is converted into a negative masking signal (L-state) of a predetermined duration (pulse width) corresponding to the masking signal at output 130 of the monostable flip-flop with Schmitt trigger 129. At the end of the masking signal transit time the timer output is switched back again into the H-state (behind the inverter). Line 121 is superfluous in such a construction.

The time switching element 115 can also have a commercial monolithic timer 125 connected as an astable multivibrator downstream of an inverter 123 with a following isolating diode 127. The H-L-H pulses of predetermined pulse duration periodically produced by timer 125 in predetermined equidistant time intervals are supplied to the control electrode of thyristor 128 after inversion by inverter 123 across isolating diode 127 and the previously described common current limiting resistor.

Thyristor 128 arranged in the control and driving part 118 is located in the circuit of the magnet coil 122 of the pump drive. This magnet coil 122 can be e.g. the driving electromagnet of a swing arm pneumatic pump or a pneumatic pump with a rotary electric drive. Whenever timer 125 releases a pulse, thyristor 128 is switched through, closes the circuit of magnet coil 122 and puts the pneumatic pump into operation for the pulse transit time (pulse width time) of the relevant pulses of timer 125.

Thyristor 128 can be replaced by triacs, mechanical relays or similar effectively controllable switching devices.

It is within the scope of the invention if the logic circuit for controlling the pneumatic pump of the level meter, whilst taking into account measuring faults on putting the apparatus into operation or during temporary power failure, as well as in the following airflow damping phase, comprises only the time switching element 115, the control and drive part 118 and the associated power supply 119. In this case the automatic continuous maintainance of the pneumatic pressure in the dip pipe with the hydrostatic pressure level of the stored liquid at the lower end of dip pipe 107 is ensured by pneumatic pump 110.

FIGS. 5 to 8 relate to a further embodiment of the apparatus according to the invention having the advantages of the embodiments described hereinbefore while completely eliminating the influences of pressure surges and fluctuations within the system which could impair the precision of the level change measurements. Such pressure surges and fluctuations are caused by the short operation of the pneumatic pump in the dip pipe and the following pressure system.

The main feature of the embodiment described hereinafter relative to FIGS. 5 to 8 is that the switching signals of a first timer used for fixing the equidistant time intervals for the level change measurement and the switching signals of a second timer used for controlling the short operation of the pneumatic pump are time-interlinked with one another in such a way that at the time of the switching signal which serves to initiate the measurement of the level change, the pressure surges and fluctuations produced in the dip pipe and the following pressure system by the short operation of the pneumatic pump have disappeared.

Figure 5:
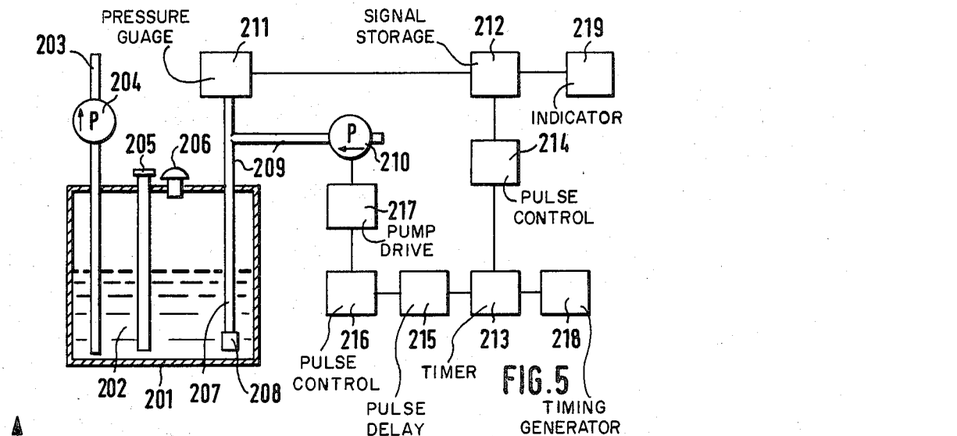
FIG. 5 the block diagram of a further embodiment of an apparatus according to the invention.

The circuit diagram of FIG. 5 is based on an apparatus according to the invention for indicating unauthorized fill level changes in conjunction with a pneumatic level meter for automatic continuous level measurement. The level of stored liquid 202 within liquid storage tank 201 is to be monitored. Tank 201 is provided with removal line 203 removal pump 204, filling line 205 and venting and ventilating connection 206 by means of which the air space above the stored liquid 202 in tank 201 is constantly connected to the atmosphere. The dip pipe 207, at whose lower end is located a measuring cup 208 (as part of the dip pipe) is fixed to the cover of tank 201 and extends to the bottom of the tank or into the vicinity thereof. The inner space of the dip pipe is kept in a narrow desired pneumatic pressure range via dip pipeline 209 by means of pneumatic pump 210, and under correct operating conditions this range is at least as large as the hydrostatic pressure of the stored liquid at the lower end of the dip pipe. The pressure within the dip pipe is measured by the pressure gauge 211, e.g., a manometer connected to the dip pipeline 209. A result of the measurement is indicated and/or converted into an electrical control quantity. The input of an analog or digital instantaneous value store 212 is connected to the output of pressure gauge 211 for a given interrogation time, e.g. 100 microseconds in the equidistant timing cycle of a timer 213 controlled by the timing generator 218 or the power supply frequency. For the purpose of further evaluation in an evaluation and alarm signal stage 219, which can also be a level indicator, the instantaneous value store 212 determines and stores the instantaneous fill level value at each of the switching signals of the common timer 213, limited or shaped by means of a pulse shortened timing element 214.

In order to compensate pressure losses which occur during the correct operation of the level meter due to natural leaks in the dip pipe and the connected pipe system and in order in this way to ensure that at the lower end of the dip pipe there is continuously a hydrostatic state of equilibrium with negligible range of variance between the dip pipe internal pressure and the liquid pressure, the common timer 213 with its timing signal also puts the pneumatic pump 210 into operation for a short time in equidistant timing intervals. For this purpose the switching signals are transferred from the timer 213 across a delaying timing element 215, which determines the start of the pump running time, across a signal shortening timing element 216 which determines the duration of the pump running time and across a control and drive part 217 which supplies the pump with driving energy during its running time. The delay timing element and a signal shortening timing element can be formed e.g. by a monostable multivibrator. The pulse width of the switching signal is advantageously made such that at a maximum it corresponds to the expected or permitted natural leaks, as well as the average pneumatic pump delivery, based on the different fill levels.

Through the arrangement of the delay timing element 215, between the control and drive part 217 and the timer 213 (or between the signal shortening timing element 216 and the timer 213), it is ensured that the pneumatic pump 210 is always briefly put into operation only at the end of the fill level interrogation process in the instantaneous value store 212. The pressure surges and fluctuations during and just after pump operation cannot, therefore, act detrimentally on pressure gauge 211 via the connecting pipes, and consequently on the level data during the level interrogation process.

Figure 6:
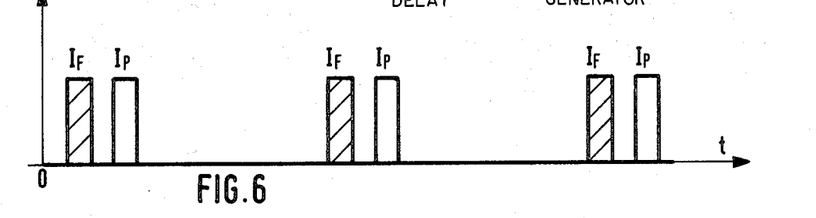
FIGS. 6, 7 & 8 diagrams illustrating the time sequence of the switching signals $I_F$ for the level change measurement and $I_P$ for controlling the short-time operation of the pneumatic pump of an apparatus according to FIG. 5.
Figure 7:
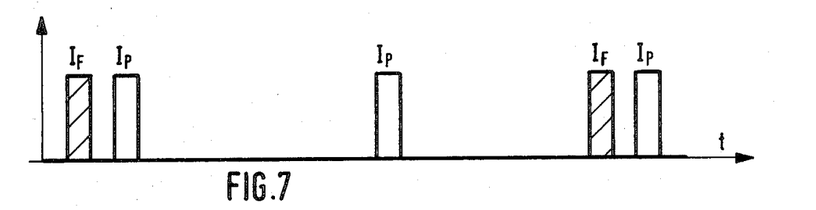
Figure 8:
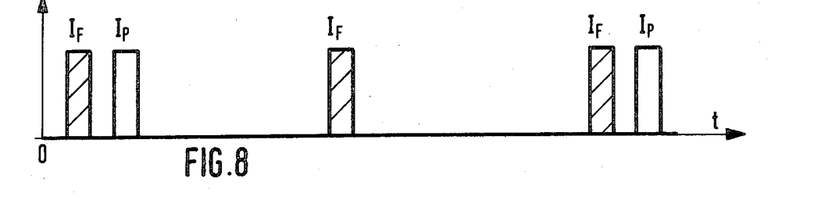

FIGS. 6, 7 and 8 are three examples for the time linking of switching signals $I_F$ used for determining the predetermined equidistant time intervals for measuring the level change and the switching signals $I_P$ used for briefly putting the pneumatic pump into operation, also in equidistant time intervals. As is apparent from the three examples, the switching frequency of the time-interlinked switching signals of both types can differ in an even or uneven division ratio. However, it is always ensured that the switching signals $I_F$, as the diagrams show, always appear after the switching signals $I_P$ and only after a relatively long pause, so that at the time of the switching signals used for initiating the measurement of the level change, the pressure surges and fluctuations produced by the short operation of the pneumatic pump in the dip pipe and the connected pressure system have disappeared.

A further, very important feature of FIG. 5 is that the meter 219, which can be a level indicator and/or a recording instrument for the measured level values stored or some other evaluation stage, e.g. for controlling an alarm signal, is connected after the instantaneous value store 212 for the periodic storage of the measured value of level meter 211 converted into analog and/or digital electrical quantities. As a result of this arrangement differing from the previously described embodiments it is ensured that the indication and/or recording or other evaluation of the measured level values is subject to no influences resulting from pressure surges and fluctuations or from bubble formation, as can be caused by the short operation of the pneumatic pump in the dip pipe and the connected pressure system, so that it is possible to further utilize the measured level values in following electronic computers or processors.

Due to the fact that the level meter 211 gives a level-dependent control signal which controls the delivery of pneumatic pump 210 in such a way that the short operation delivery of the pump, based on the complete level measuring range is constant it can, if desired, be ensured that the pump delivery is always the same both with a low and a high liquid level. Such a delivery control can, for example, be brought about by means of a phase lag control of the pneumatic pump drive or a pulse width control of the switching signal for the pneumatic pump drive.

All the switching and control functions in an apparatus according to the invention can also be performed by a programmed microprocessor.

I claim:

1. A method for automatically indicating abnormal changes in the plurality of liquid stored in a liquid storage tank, including both abnormal increases and abnormal decreases in the quantity of liquid, said method comprising measuring at periodic, equidistant time intervals and the actual value of the change of level of the liquid within the tank since the last such measurement; comparing the measured actual value of change with a preset value representing the maximum value permitted for the change of level during such time interval; and when the measured actual value of change exceeds the preset value, activating an indicator.

2. Apparatus for automatically indicating abnormal changes in the quantity of liquid stored in a liquid storage tank including both abnormal increases and abnormal decreases in the quantity of liquid, said apparatus comprising first means for measuring at periodic, equidistant time intervals the actual value of the change of level of the liquid within the tank since the last such measurement; second means for comparing the measured actual value of change with a preset value representing the maximum value permitted for the change of level during such time interval; and third means for providing an indication when the measured actual value of change exceeds the preset value.

3. Apparatus as claimed in claim 2 in which:
said first means comprises level measuring means for measuring the level of the liquid within the tank and providing a signal indicative thereof; timing means for generating actuating signals at the equidistant time intervals; and signal storage means responsive to the actuating signals for storing the signal provided by said level measuring means at the time each actuation signal is generated;
said second means comprises monitoring means for monitoring the signal stored in said storage means; and generating means responsive to a change in the monitored signal in excess of a preset value for generating an output signal; and
said third means comprises indicating means responsive to an output signal from said second means for providing the indication.

4. Apparatus as claimed in claim 3 in which:
said level measuring means comprises analog measuring means for providing an analog signal indicative of the level of the liquid, and analog to digital converter means for converting the analog signal to a digital signal indicative of the level of the liquid;
said storage means comprises digital storage means;
said monitoring means comprises a digital subtractor for subtracting the value of the digital signal stored in said digital storage just following the time of an actuating signal from the value of the digital signal stored in said digital storage means just prior to the time of that actuating signal.

5. Apparatus as claimed in claim 4 in which said generating means comprises a digital comparator for comparing the results of each operation of said digital subtractor with a preset value.

6. Apparatus as claimed in claim 2 in which:
said first means comprises level measuring means for measuring the level of the liquid within the tank and providing a signal indicative thereof; timing means for generating actuating signals at the equidistant time intervals; and signal storage means responsive to the actuating signals for storing the signal provided by said level measuring means at the time each actuation signal is generated;
said second means comprises means for monitoring the signal stored in said signal storage means; first generating means responsive to a change in the monitored signal of a first polarity and in excess of a first preset value for generating a first output signal; and second generating means responsive to a change in the monitored signal of a second polarity, opposite the first polarity, and in excess of a second preset value for generating a second output signal; and
said third means comprises first indicating means responsive to the first output signal for providing a first indication and second indicating means responsive to the second output signal for providing a second indication.

7. Apparatus as claimed in claim 6 in which:
said level measuring means comprises analog measuring means for providing an analog signal indicative of the level of the liquid, and analog to digital converter means for converting the analog signal to a digital signal indicative of the level of the liquid;
said storage means comprises digital storage means;
said monitoring means comprises a digital subtractor for subtracting the value of the digital signal stored in said digital storage just following the time of an actuating signal from the value of the digital signal stored in said digital storage means just prior to the time of that actuating signal.

8. Apparatus as claimed in claim 7 in which each said generating means comprises a digital comparator for comparing the results of each operation of said digital subtractor with a preset value.

9. Apparatus as claimed in claim 5 or 7 in which said digital storage means, said digital subtractor, and said digital comparator make up a microprocessor.

10. Apparatus as claimed in claim 2 further comprising fourth means for disabling said third means to prevent provision of an indication while the storage tank is being filled.

11. Apparatus as claimed in claim 2 in which said first means comprises a pneumatic level meter; a dip pipe extending from said pneumatic level meter to a point adjacent the bottom of the storage tank; a pneumatic pump connected to said dip pipe to produce a pneumatic pressure in said dip pipe at least as great as the hydrostatic pressure of the liquid at the lower end of said dip pipe; and control means for controlling the operating cycle of said pneumatic pump to maintain the pneumatic pressure in said dip pipe at a value corresponding with the hydrostatic pressure at the lower end of said dip pipe, the hydrostatic pressure indicating the liquid level.

12. Apparatus as claimed in claim 11 in which said control means includes first timer means for operating said pneumatic pump for a predetermined time when said apparatus is started up and after temporary interruption of electrical power.

13. Apparatus as claimed in claim 12 in which said control means further includes inhibiting means for inhibiting the indication during the predetermined time of operation of said first timer means to prevent erroneous pressure indications during startup and after temporary interruption of electrical power.

14. Apparatus as claimed in claim 13 in which said control means further includes second timer means for automatically operating said pump for predetermined equidistant time intervals to maintain the pneumatic pressure in said dip pipe at the level of the hydrostatic pressure of the liquid at the lower end of said dip pipe.

15. Apparatus as claimed in claim 14 in which said control means further includes means responsive to said first timer means for causing operation of said second timer means during time intervals such that the predetermined equidistant time intervals of said second timer means are timed during periods when said first timer means, and thus said inhibiting means, are inactive.

16. Apparatus as claimed in claim 11 in which said control means comprises a clock pulse source, a timer responsive to pulses from said clock pulse source for generating timing pulses, first pulse control means coupled to said timer and said level meter for causing said level meter to indicate the pneumatic pressure in said dip pipe at periodic, equidistant time intervals initiated by the timing pulses, and second pulse control means coupled to said timer and said pneumatic pump for initiating operation of said pump at predetermined time intervals.

17. Apparatus as claimed in claim 3 in which said level measuring means comprises a pneumatic level meter, a dip pipe extending from said pneumatic level meter to a point adjacent the bottom of the storage tank, a pneumatic pump connected to said dip pipe to produce a pneumatic pressure in said dip pipe at least as great as the hydrostatic pressure of the liquid at the lower end of the dip pipe, a timer for automatically operating said pump for predetermined equidistant time intervals to maintain the pneumatic pressure in said dip pipe at the level of the hydrostatic pressure of the liquid at the lower end of said dip pipe; means responsive to said timing means for causing operation of said timer during time intervals such that the predetermined equidistant time intervals of said timer are timed during periods when said timing means is inactive.

* * * * *